(12) United States Patent
Evans

(10) Patent No.: US 10,651,712 B2
(45) Date of Patent: May 12, 2020

(54) ROTOR FOR AN ELECTRICAL MACHINE

(71) Applicant: Evans Electric Pty Limited, Arndell Park, New South Wales (AU)

(72) Inventor: Paul Douglas Evans, Arndell Park (AU)

(73) Assignee: Evans Electric Pty Limited, New South Wales (AU)

( * ) Notice: Subject to any disclaimer, the term of this patent is extended or adjusted under 35 U.S.C. 154(b) by 782 days.

(21) Appl. No.: 15/560,152

(22) PCT Filed: Mar. 20, 2015

(86) PCT No.: PCT/AU2015/000165
§ 371 (c)(1),
(2) Date: Sep. 20, 2017

(87) PCT Pub. No.: WO2015/139080
PCT Pub. Date: Sep. 24, 2015

(65) Prior Publication Data
US 2018/0097428 A1 Apr. 5, 2018

(30) Foreign Application Priority Data

Mar. 21, 2014 (AU) ................................ 2014900988

(51) Int. Cl.
*H02K 17/16* (2006.01)
*H02K 17/18* (2006.01)

(52) U.S. Cl.
CPC ......... *H02K 17/165* (2013.01); *H02K 17/185* (2013.01)

(58) Field of Classification Search
CPC ........................... H02K 17/165; H02K 17/185
See application file for complete search history.

(56) References Cited

U.S. PATENT DOCUMENTS 5,861,700 A * 1/1999 Kim .................. H02K 1/32
310/216.119
7,741,750 B1 * 6/2010 Tang .................. H02K 1/165
310/216.004

(Continued)

FOREIGN PATENT DOCUMENTS

JP 2006-345627 12/2006
JP 2011-172385 9/2011

OTHER PUBLICATIONS

Machine translation for JP 2006-345627 of Dec. 21, 2006.*
Machine translation for JP 2011-172385 of Sep. 1, 2011.*

*Primary Examiner* — Emily P Pham
(74) *Attorney, Agent, or Firm* — LaMorte & Associates P.C.

(57) ABSTRACT

A rotor (10) for an axial-flux electrical machine (12) is provided. The rotor (10) comprises an annular disc-shaped central frame (20) formed of a ferromagnetic material and having first and second opposing surfaces (26, 28). Each of the first and second opposing surface (26, 28) has shaped protrusions (40) extending therefrom. The rotor (10) further comprises a first and a second outer frame (22, 24) formed of a non-ferromagnetic, electrically conducting material. Each outer frame (22, 24) has an inner periphery portion (32) and an outer periphery portion (34) and a plurality of bars (36) galvanically connecting the inner and outer periphery portions (32, 34). Gap portions (38) are defined between adjacent bars (36) and the inner and outer periphery portions (32, 34). The gap portions (38) are shaped complementary to the shaped protrusions (40) of the central frame (20).

24 Claims, 4 Drawing Sheets

(56) References Cited

U.S. PATENT DOCUMENTS

| | | | | |
|---|---|---|---|---|
| 8,624,456 B2* | 1/2014 | Lamperth | ............ | H02K 1/2793 |
| | | | | 310/156.12 |
| 2004/0245879 A1* | 12/2004 | Hirzel | ...................... | H02K 1/02 |
| | | | | 310/156.01 |
| 2008/0001488 A1* | 1/2008 | Pyrhonen | ............. | H02K 17/165 |
| | | | | 310/60 R |
| 2012/0212085 A1* | 8/2012 | Fu | ............................ | H02K 7/11 |
| | | | | 310/58 |
| 2014/0139161 A1* | 5/2014 | Ueda | ........................ | H02P 6/16 |
| | | | | 318/400.37 |
| 2015/0091403 A1* | 4/2015 | Ueda | .................... | H02K 21/145 |
| | | | | 310/114 |
| 2015/0295456 A1* | 10/2015 | Michaelides | .......... | H02K 1/148 |
| | | | | 310/156.01 |

\* cited by examiner

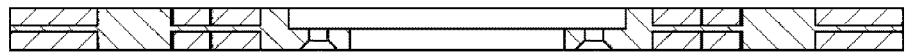
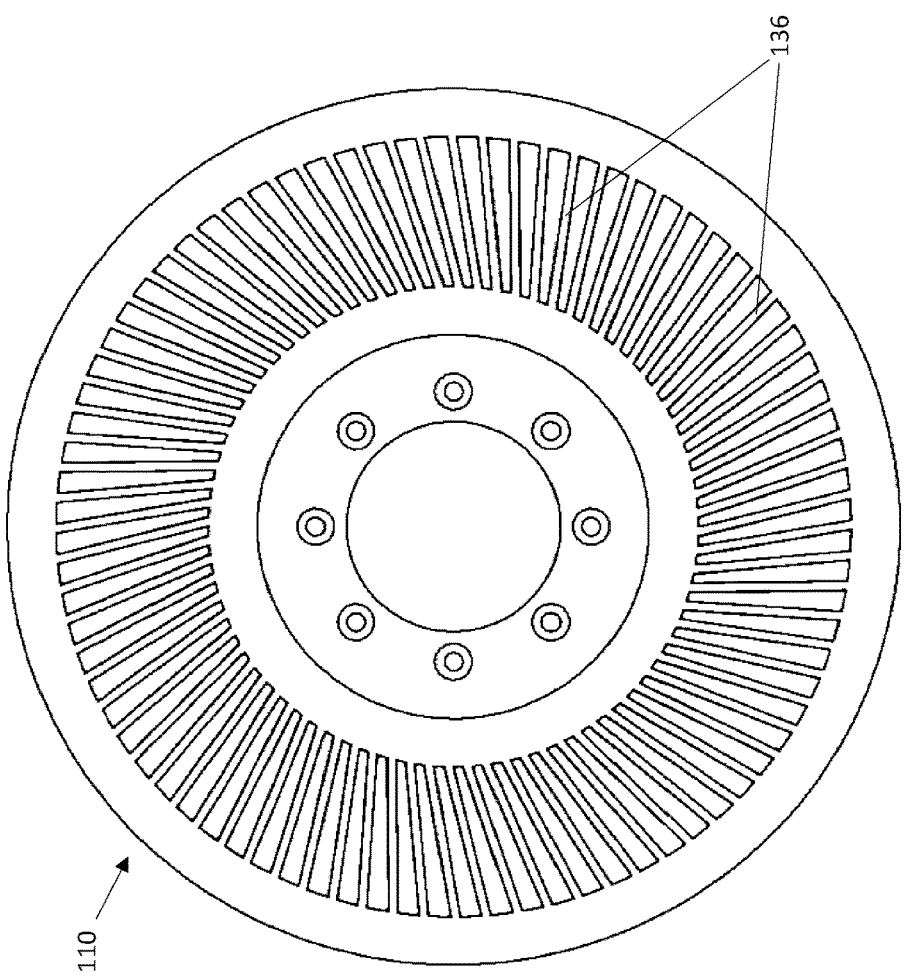
FIGURE 5
FIGURE 4

ROTOR FOR AN ELECTRICAL MACHINE

FIELD OF THE INVENTION

The present invention relates to a rotor for use in an electrical machine and in particular to a rotor for use in an axial flux induction electrical machine.

The invention has been developed primarily for use in/with electrical motors for electric/hybrid vehicles and will be described hereinafter with reference to this application. However, it will be appreciated that the invention is not limited to this particular field of use.

BACKGROUND OF THE INVENTION

In nearly all hybrid vehicles, it is desirable to minimise the size and weight of the automotive components. At the same time, it is also desirable to maximise the power output of electrical machines used in hybrid vehicles.

Thus, for hybrid vehicles it is desirable to use electrical machines with high power output per unit mass (often referred to as "power density" and measured in kW/kg). Unfortunately, however, existing electrical machines do not satisfy these requirements and so do not lend themselves well to use in hybrid vehicles.

Similar considerations apply to electrical machines used to power purely electric vehicles.

Electrical machines that are of the axial-flux type are in several ways best suited for use in hybrid vehicles and purely electric vehicles. One reason for this is because they can be designed to have a high power density. However, the design of axial-flux machines insofar as it relates to their assembly and operation is not optimized. Assembly can be difficult and operation can be unreliable. This is particularly the case in relation to the rotors of such machines.

An object of the claimed invention is to provide a rotor for an axial-flux electrical machine which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, a rotor for an axial-flux electrical machine is provided. The rotor the rotor comprises:

an annular disc-shaped central frame formed of a ferromagnetic material and having first and second opposing surfaces, wherein each of the first and second opposing surfaces have shaped protrusions extending therefrom;

a first and a second outer frame formed of a non-ferromagnetic, electrically conducting material, each outer frame having an inner periphery portion and an outer periphery portion and a plurality of bars galvanically connecting the inner and outer periphery portions, wherein gap portions are defined between adjacent bars and the inner and outer periphery portions, the gap portions being shaped complementary to the shaped protrusions of the central frame;

wherein the first outer frame is affixed to the first surface of the central frame and the second outer frame is affixed to the second surface of the central frame with the shaped protrusions extending through the gap portions of the outer frames.

Preferably, the central frame is integrally formed.
Preferably, each outer frame is integrally formed.
Preferably, the plurality of bars extend radially between the inner and outer periphery portions.

Preferably, each outer frame further includes at least one intermediary portion arranged between the inner and outer periphery portions and intersecting the plurality of bars.

Preferably, ferromagnetic material is steel and the non-ferromagnetic material is aluminium or copper.

Preferably, the central frame and the outer frames are formed by a process of milling, laser cutting, water jet cutting, electrical discharge machining or casting.

Preferably, the number of bars is selected on the basis of a ratio with the number of slots on the stator of the axial-flux electrical machine. Ideally, the ratio is a high ratio with more bars compared to stator slots such as 1.666:1.

According to a second aspect of the present invention, there is provided rotor for an axial-flux electrical machine, the rotor comprising:

an annular disc-shaped central frame formed of a ferromagnetic material and having first and second opposing surfaces, wherein each of the first and second opposing surfaces have shaped protrusions extending therefrom;

a first and a second outer frame formed of a non-ferromagnetic, electrically conducting material, each outer frame having an inner periphery portion, an outer periphery portion and at least one intermediary portion between the outer and inner periphery portions; a plurality of bars galvanically connect the inner and the at least one intermediary portions and the outer periphery portions, wherein gap portions are defined between adjacent bars and the inner, the at least one intermediary and the outer periphery portions, the gap portions being shaped complementary to the shaped protrusions of the central frame;

wherein the first outer frame is affixed to the first surface of the central frame and the second outer frame is affixed to the second surface of the central frame with the shaped protrusions extending through the gap portions of the outer frames.

Other aspects of the invention are also disclosed.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 4 is a plan view of a rotor in accordance with another preferred embodiment of the present invention;

FIG. 5 is a cross-sectional view of the rotor of FIG. 4;

DESCRIPTION OF EMBODIMENTS

Figure 1:
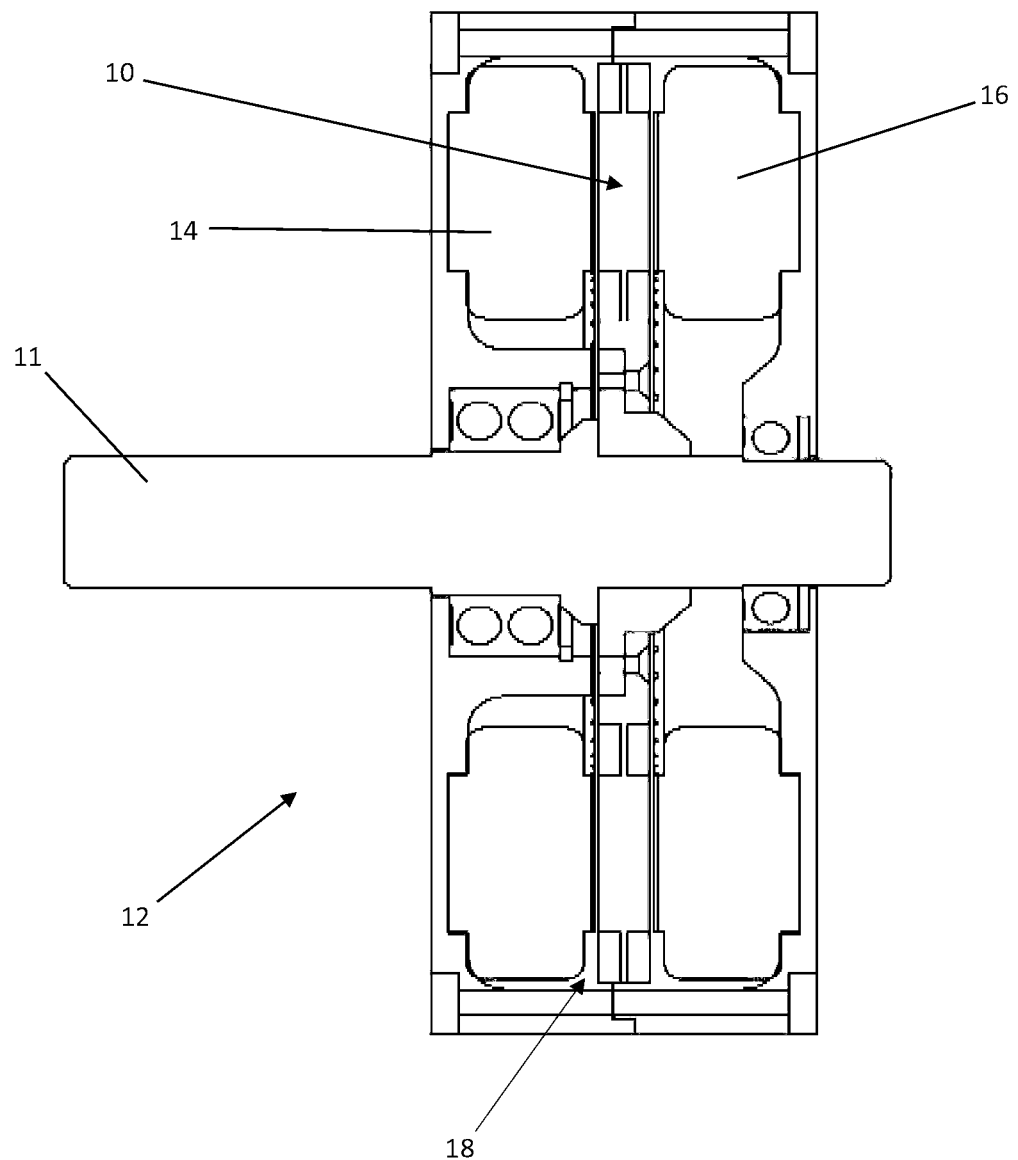
FIG. 1 is a schematic diagram of an axial flux induction machine incorporating a rotor in accordance with a preferred embodiment of the present invention.

It should be noted in the following description that like or the same reference numerals in different embodiments denote the same or similar features.

The invention relates to a rotor 10 for an axial flux induction electrical machine 12. Referring to FIG. 1, the machine 10 includes a first stator 14 and a second stator 16 in a symmetrical mirrored relationship to the first stator 14 such that a gap 18 is defined intermediate the first and second stator 14, 16. A rotor 10, in the shape of a thin annular disc, is disposed in the gap 18. The thickness of the disc is substantially smaller than the radius of the disc.

Figure 3:
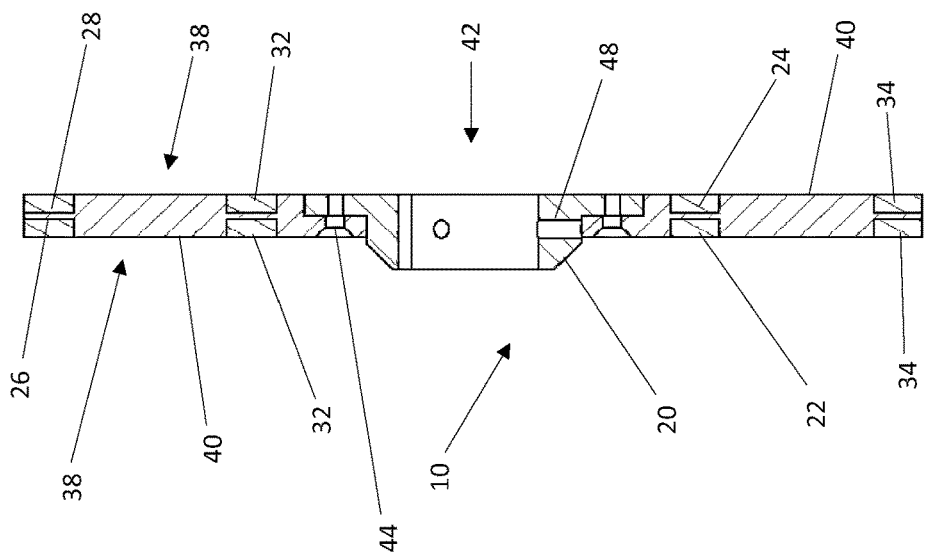
FIG. 3 is a cross-sectional view of the rotor of FIG. 2.
Figure 2:
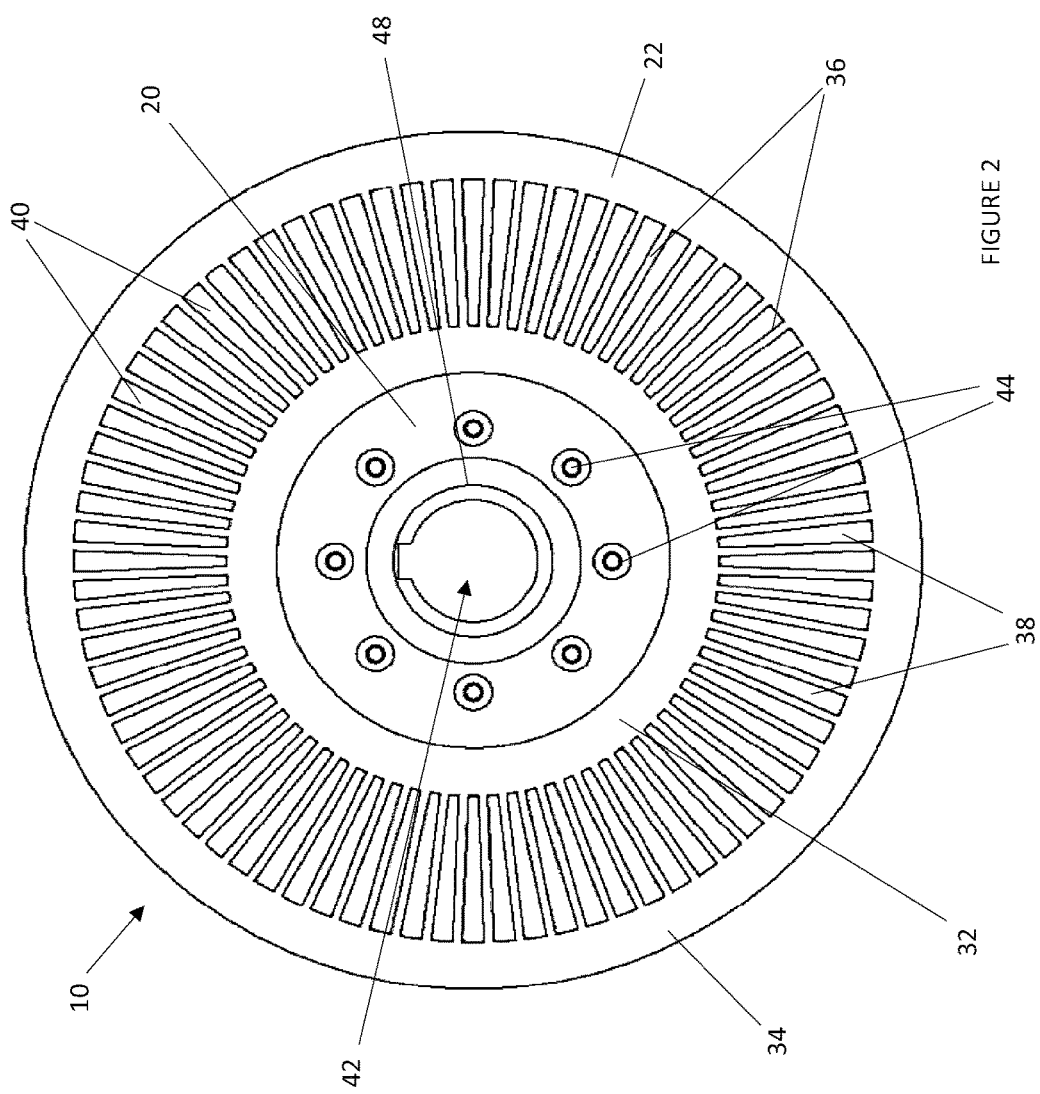
FIG. 2 is a plan view of a rotor in accordance with a preferred embodiment of the present invention.

Referring to FIGS. 2 and 3, the rotor structure 10 is comprised of a central ferromagnetic material frame 20 and two outer non-ferromagnetic material frames 22, 24 affixed to opposing surfaces 26, 28 of the central frame 20.

The non-ferromagnetic frames 22, 24 are fabricated with high electrically conducting material such as aluminium or copper. The non-ferromagnetic frames 22, 24 comprise an inner periphery 32 and an outer periphery 34. Conducting bars 36 fabricated of the same material are galvanically connected to the peripheries 32, 34. The conducting bars 36 together with the inner and outer peripheries 32, 34 form the cage winding of the rotor 10. As shown, the conducting bars 36 are arranged extending radially from the inner 32 to the outer periphery 34. However, other configurations of the conducting bars will also work. For example, FIGS. 4 and 5 show an alternative embodiment of a rotor 110 in which the conducting bars 136 have a skewed arrangement.

The number of conducting bars 36 is ideally selected on a ratio basis of the number of slots on the stator 14, 16. It is been found that by having a high ratio (i.e. more conducting bars compared with number of stator slots) there is a reduction in differential leakage compared with using a low ratio. The ideal ratio has been found to be 1.666:1. In the embodiment illustrated this ratio equates with 80 conducting bars for use with a stator having 48 stator slots.

The construction of the non-ferromagnetic frames 22, 24 provides gap portions 38 defined between adjacent conducting bars 36 and the inner 32 and outer 34 peripheries.

In order to provide the disc rotor 10 with a high level of structural rigidity, to allow the rotor 10 to retain dimensional stability and withstand both axial and radial structural stresses and moment stress, the central frame 20 is fabricated with a ferromagnetic material such as steel. The ferromagnetic frame 20 is integrally formed as a single piece.

On the opposing sides 26, 28 of the central frame 20, integrally formed shaped protrusions 40 extend from the frame 20. The protrusions 40 are shown as wedge shaped which match the shape of the gap portions 38 in the non-ferromagnetic frames 22, 24.

The non-ferromagnetic frames 22, 24 are placed respectively on each side 26, 28 of the central frame 20 with the wedge-shaped protrusions 40 fitting in and extending through the gap portions 38 of the non-ferromagnetic frames 22, 24. The non-ferromagnetic frames 22, 24 can be secured in place using a suitable epoxy, for example.

The arrangement enhances the flux carry capacity of the rotor 10 and provides a magnetic flux path between the first and second stator 14, 16 due to the plurality of ferromagnetic wedge-shaped protrusions 40 extending through the non-ferromagnetic frames 22, 24 and being spaced apart from each other at an appropriate distance so that the radial non-ferromagnetic conductor bars 36 are appropriately located between the protrusions 40.

The central frame 20 has a central hole 42, in which is received a separate hub member. The hub member is used to fix the rotor to be mounted on a shaft 11 of the machine 12, for example by way of radial grub screws and a shaft key. A number of additional holes 44 surround the central hole 42 for receiving bolts, screws or other suitable means in order to secure the rotor 10 to the hub member.

The hub member is not shown on the alternative embodiments illustrated in FIGS. 4 to 7.

Figure 7:
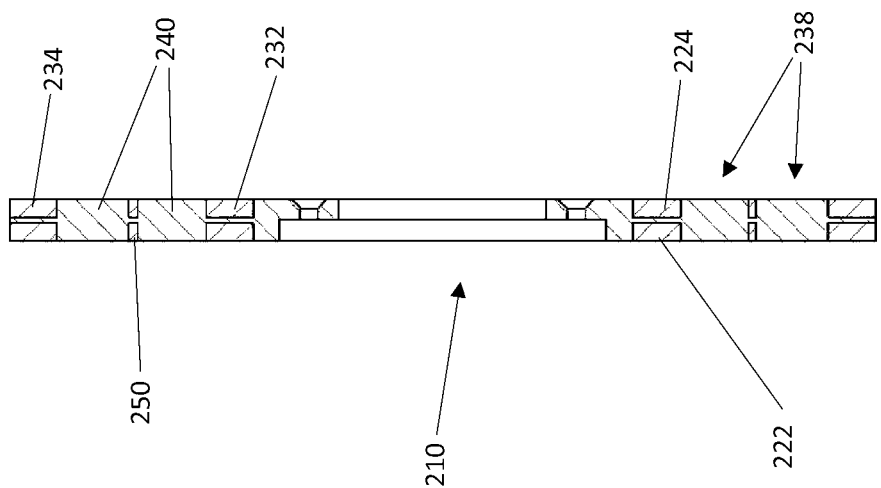
FIG. 7 is a cross-sectional view of the rotor of FIG. 6.
Figure 6:
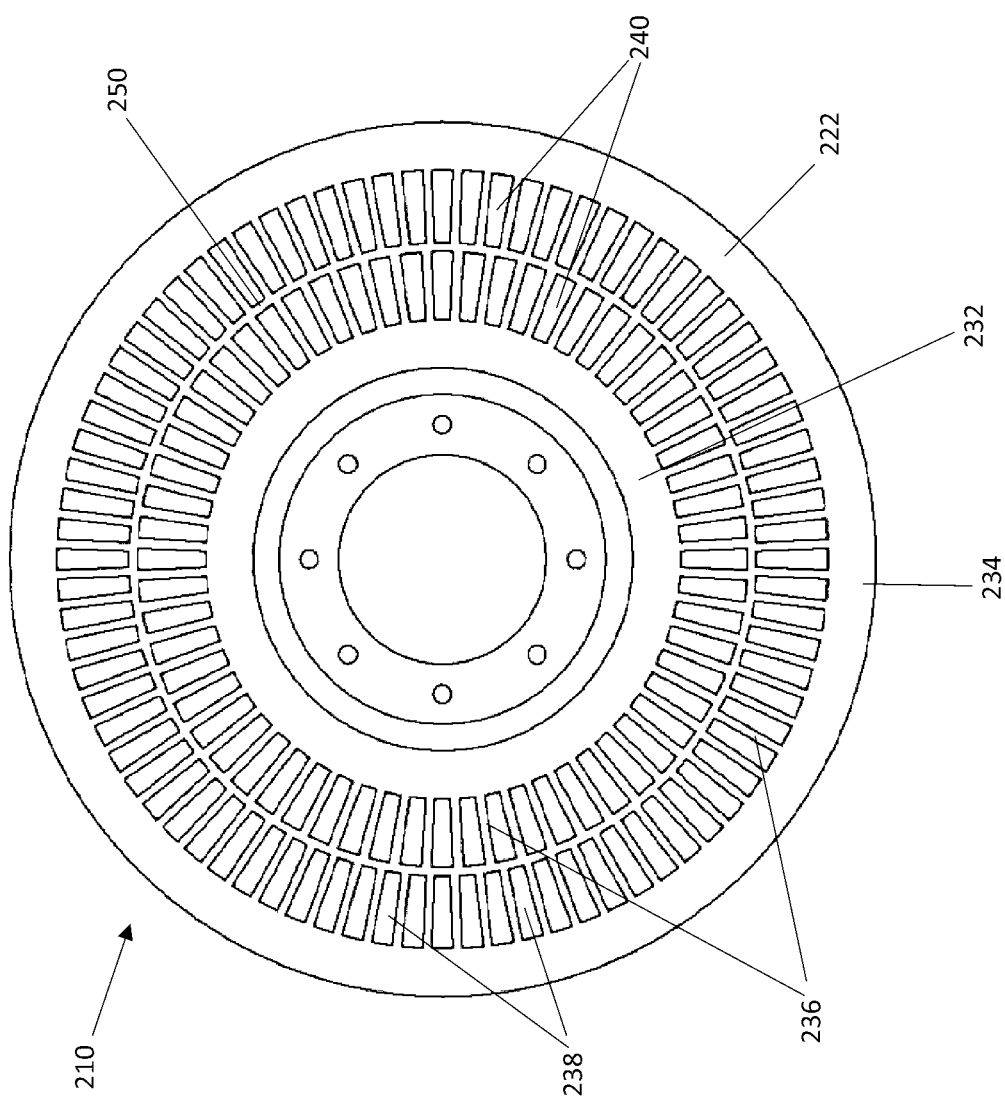
FIG. 6 is a plan view of a rotor in accordance with another preferred embodiment of the present invention.

FIGS. 6 and 7 show an alternative embodiment of the rotor 210. In this embodiment the non-ferromagnetic frames 222, 224 have an intermediary portion 250 arranged between the inner 232 and outer 234 periphery. Conducting bars 236 extend between the inner periphery 232 and the intermediary portion 250; and between the intermediary portion 250 and the outer periphery 234. Again, this arrangement provides gap portions 238 and the central frame 220 has complementary shaped protrusions 240 for fitting and extending through the gap portions 238. In tests it has been found that the rotor 210 incorporating the intermediary portion 250 improves performance by providing an improved magnetic circuit and reduced torque ripple.

The ferromagnetic and non-ferromagnetic rotor parts 20, 22, 24 may be fabricated from sheet metal using material removal methods by means of milling, laser cutting, water jet cutting or electrical discharge machining. Alternatively, the rotor parts 20, 22, 24 could be fabricated using direct metal sintering 3D printing methods.

In preferred embodiments, the central frame 20 is formed by a casting process. Potentially, the non-ferromagnetic frames 22, 24 could be formed by die-casting onto the central ferromagnetic frame 20 using the ferromagnetic frame as a form within the die cast tooling.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the electrical machine industries.

The claims defining the invention are as follows:

1. A rotor for an axial-flux induction electrical machine, the rotor comprising:
    an annular central frame made of a ferromagnetic material, said annular central frame having a first surface and an opposing second surface, wherein said first surface and said opposing second surface have shaped protrusions extending therefrom;
    a first outer frame and a second outer frame made from an electrically conductive material that is non-ferromagnetic, said first outer frame and said second outer frame both having inner periphery portions, outer periphery portions, and bars galvanically connecting said inner periphery portions to said outer periphery portions; and
    gap portions are defined between at least some of said bars and both said inner periphery portions and said outer periphery portions, said gap portions being shaped complementary to said shaped protrusions of said annular central frame;
    wherein said first outer frame is affixed to said first surface of said annular central frame and said second outer frame is affixed to said opposing second surface of said annular central frame with said shaped protrusions, and wherein said shaped protrusions extend through said gap portions.

2. The rotor according to claim 1, wherein said bars extend radially between said inner periphery portions and said outer periphery portions.

3. The rotor according to claim 2, wherein said bars are electrically conductive.

4. The rotor according claim 3, wherein said bars, said first outer frame and said second outer frame are made from a common electrically conductive material.

5. The rotor according to claim 1, wherein said first outer frame and said second outer frame includes at least one intermediary portion arranged between said inner periphery portions and said outer periphery portions, wherein said at least one intermediary portion intersects said bars.

6. The rotor according to claim 1, wherein said ferromagnetic material is steel.

7. The rotor according to claim 1, wherein said first outer frame and said second outer frame are made from a non-ferromagnetic material selected from a group consisting of aluminum and copper.

8. The rotor according to claim 1, wherein said annular central frame is formed from said ferromagnetic material using a forming process selected from a group consisting of milling, laser cutting, water jet cutting and casting.

9. The rotor according to claim 1, wherein said first outer frame and said second outer frame are formed from a non-ferromagnetic material using a forming process selected from a group consisting of milling, laser cutting, water jet cutting and casting.

10. The rotor according to claim 1, wherein said first outer frame and said second outer frame are cast directly onto said annular central frame.

11. The rotor according to claim 1, wherein said axial-flux electrical machine has a stator with a number of slots, wherein said bars are present in a ratio to said number of slots.

12. The rotor according to claim 11, wherein said ratio results in more of said bars than said number of slots.

13. The rotor according to claim 12, wherein said ratio is 1.666:1.

14. A rotor for an axial-flux induction electrical machine, said rotor comprising:

an annular central frame that is ferromagnetic, said annular central frame having a first surface and an opposing second surface, wherein each of said first surface and said opposing second surface have shaped protrusions extending therefrom;

a first outer frame and a second outer frame that are electrically conductive and non-ferromagnetic, said first outer frame and said second outer frame having inner periphery portions, outer periphery portions, and at least one intermediary portion between said outer periphery portion and said inner periphery portions; and bars galvanically connecting said inner periphery portions, said outer periphery portions and said at least one intermediary portion, wherein gap portions are defined between at least some of said bars and said inner periphery portions, said outer periphery portions, and said at least one intermediary portion, said gap portions being shaped complementary to said shaped protrusions of said annular central frame;

wherein said first outer frame is affixed to said first surface of said annular central frame and said second outer frame is affixed to said opposing second surface of said annular central frame with said shaped protrusions extending through said gap portions.

15. The rotor according to claim 14, wherein said bars extend radially from said inner periphery portions.

16. The rotor according to claim 14, wherein said annular central frame is steel.

17. The rotor according to claim 14, wherein said first outer frame and said second outer frame are made from a non-ferromagnetic material selected from a group consisting of aluminum and copper.

18. The rotor according to claim 14, wherein said annular central frame is formed from a ferromagnetic material using a forming process selected from a group consisting of milling, laser cutting, water jet cutting, electrical discharge machining and casting.

19. The rotor according to claim 14, wherein said first outer frame and said second outer frame are formed from a non-ferromagnetic material using a forming process selected from a group consisting of milling, laser cutting, water jet cutting, electrical discharge machining and casting.

20. The rotor according to claim 14, wherein said first outer frame and said second outer frame are cast directly onto said annular central frame.

21. The rotor according to claim 14, wherein said axial-flux electrical induction machine has a stator with a number of slots, wherein said bars are present in a ratio to said number of slots.

22. The rotor according claim 21, wherein said ratio results in more of said bars than said number of slots.

23. The rotor according to claim 22, wherein said ratio is 1.666:1.

24. An axial flux electrical machine, comprising:

a stator with a number of slots;

a rotor having an annular central frame made of a ferromagnetic material, said annular central frame having a first surface and an opposing second surface, wherein said first surface and said opposing second surface have shaped protrusions extending therefrom;

said rotor further including a first outer frame and a second outer frame made from an electrically conductive material that is non-ferromagnetic, said first outer frame and said second outer frame both having inner periphery portions, outer periphery portions, and bars galvanically connecting said inner periphery portions to said outer periphery portions, wherein said bars outnumber said number of slots in said stator; and gap portions are defined between at least some of said bars and both said inner periphery portions and said outer periphery portions, said gap portions being shaped complementary to said shaped protrusions of said annular central frame;

wherein said first outer frame is affixed to said first surface of said annular central frame and said second outer frame is affixed to said opposing second surface of said annular central frame with said shaped protrusions, and wherein said shaped protrusions extend through said gap portions.

* * * * *